US006744856B2

(12) United States Patent
Karnik et al.

(10) Patent No.: US 6,744,856 B2
(45) Date of Patent: Jun. 1, 2004

(54) METHOD AND APPARATUS FOR SERVICING EMERGENCY CALLS FROM A DATA NETWORK

(75) Inventors: Gerhard Eugene Karnik, Westchester, IL (US); Joe Sunil Mallavarapu, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 216 days.

(21) Appl. No.: 09/775,142

(22) Filed: Jan. 31, 2001

(65) Prior Publication Data

US 2002/0101961 A1 Aug. 1, 2002

(51) Int. Cl.[7] .............................................. H04M 11/00
(52) U.S. Cl. ........................................ 379/45; 379/37
(58) Field of Search ............... 379/37–51, 93.01–93.08, 379/90.01, 93.17, 93.26–93.28

(56) References Cited

U.S. PATENT DOCUMENTS 6,028,915 A * 2/2000 McNevin ..................... 379/49

6,456,695 B2 * 9/2002 Lee ............................. 379/41

* cited by examiner

Primary Examiner—Wing Chan

(57) ABSTRACT

Emergency calls are serviced from a data communications device (104) via a wide area data network (102), for example, the Internet. A user of the communications device registers for emergency call service on an emergency call site that is associated with the wide area data network (200). An operator is associated with the emergency call site for handling emergency calls. When required, the user initiates an emergency call from the communications device (202). Then, the user provides information about the emergency to the operator through a real-time online chat (210). The operator performs a database query to determine emergency numbers for responding to the emergency based on the information received from the user (212). After selecting the appropriate emergency number, the operator connects the call to a local authority who is associated with the selected emergency number via the public telephone network (216).

16 Claims, 2 Drawing Sheets

METHOD AND APPARATUS FOR SERVICING EMERGENCY CALLS FROM A DATA NETWORK

FIELD OF THE INVENTION

The present invention relates generally to wide area data networks, and in particular, to a method for initiating emergency calls from a data communications device coupled to a wide area data network.

BACKGROUND OF THE INVENTION

The public telephone network is known to handle emergency calls that are made to the network for emergency assistance. Typically, after a database query for emergency numbers associated with a telephone line, an operator in the telephone network connects the call to an emergency authority for the dispatch of emergency services. Then, the emergency authority handles the dispatch of emergency units such as paramedics, police and firefighters.

Presently, users of data communications devices can communicate with each other via a wide area data network, for example, the Internet. Exemplary data communications devices include computers and personal digital assistants (PDAs). These devices provide users with an alternative way to communicate with others for personal or business-related matters, especially in situations where a telephone is unavailable or is not within close proximity to the user. For instance, users communicate with others through an Internet Relay Chat, or IRC, which is a real-time online chat that allows simultaneous communication between Internet users.

Unfortunately, data communications devices are not equipped to handle traditional voice communications, and as a result, in emergency situations where no telephone exist, there is no way to make an emergency call. Therefore, a need exists for a method and apparatus to facilitate emergency calls from data communications devices.

SUMMARY OF THE INVENTION

A method is provided for servicing emergency calls from a data communications device that is coupled to a wide area data network, for example, the Internet. Preferably, the communications device is a computer or a personal digital assistant with a keypad. First, a user of the communications device registers for emergency call service on an emergency call site that is associated with the wide area data network. The registration information preferably contains data about the user and the hardware and software components of the device. This data is stored in a user database associated with the emergency call site or, alternatively, stored in a memory of the device, for example, as a web browser cookie. When required, the user initiates an emergency call from the device. The call is initiated by pressing a button that is located on the keypad of the device for emergency calls. Alternatively, the call is initiated by dialing a predetermined sequence of keys on the keypad of the device. Then, the call is connected to the emergency call site over the wide area data network. The site preferably starts up a real-time online chat interface between the user and an operator located at an operator station that is associated with the emergency call site. Alternatively, communications between the user and the operator are established through a telephone call over the wide area data network or through the telephone network. The identity of the user is displayed to the operator. The operator receives data about the emergency from the user via the real-time online chat or other communications interface. The operator performs a database query to determine emergency numbers for responding to the emergency based on the data received from the user. The list of emergency numbers is stored in an emergency service numbers database that is associated with the emergency call site and accessible through the telephone network. The operator may select one of the numbers from the list of emergency numbers and call a local authority who is either an emergency authority who dispatches emergency units, or a public safety answering point that connects the call to the emergency authority. Alternatively, the emergency call is handled by an automated system instead of a live operator.

DETAILED DESCRIPTION OF THE PREFERRED EMBODIMENTS

Figure 1:
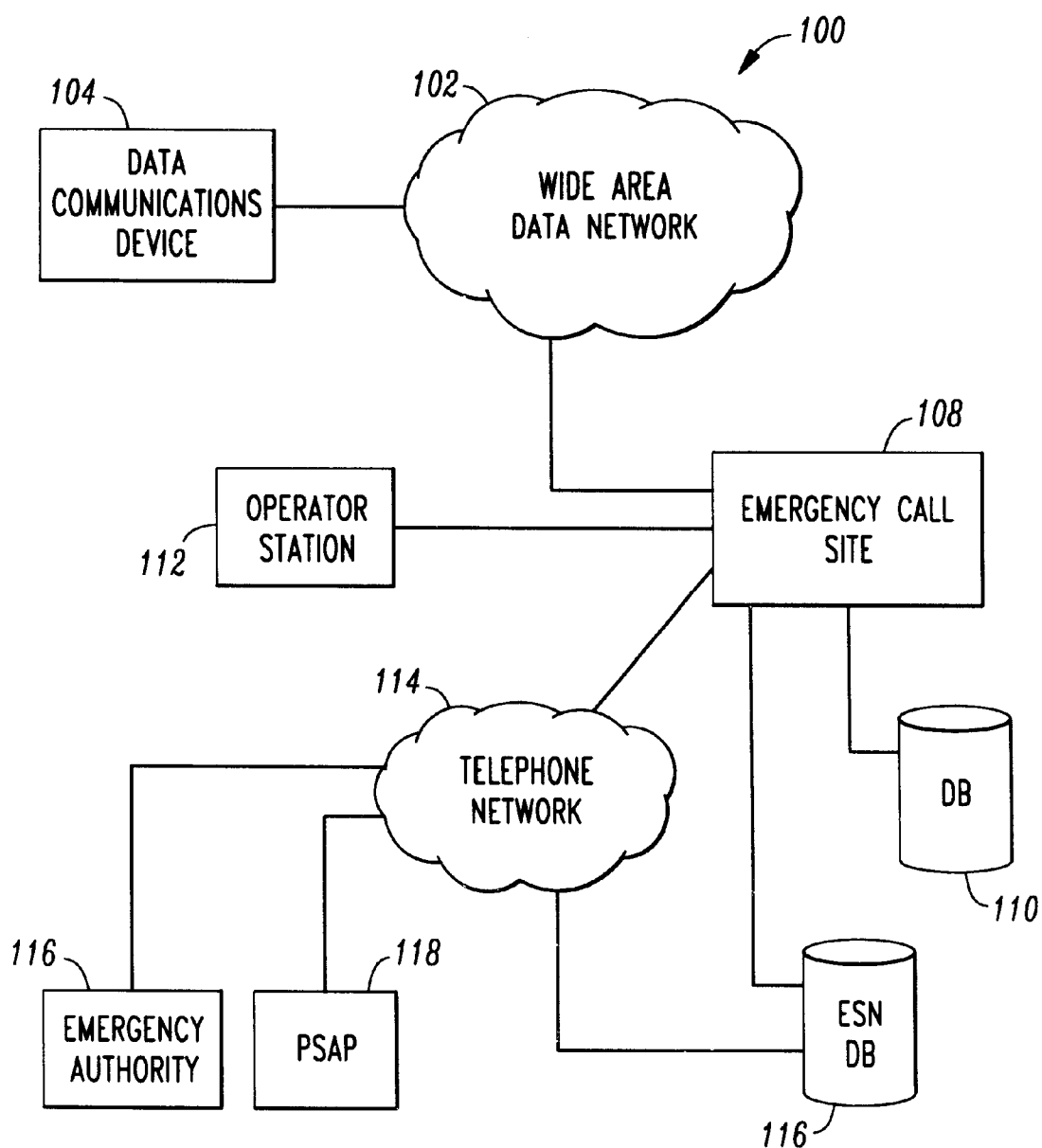
FIG. 1 is a block diagram of a wide area communications system including a wide area data network and a telephone network in accordance with the present invention.

FIG. 1 is a block diagram of wide area communications system 100. System 100 includes wide area data network 102 and telephone network 114. Network 102 is preferably the Internet. Network 102 consists of multiple processors interconnected for data communications. Network 102 provides various services to users including, Internet Relay Chat (IRC), a real-time chat feature that allows users to exchange messages simultaneously on the network. Data communications device 104 is coupled to network 102 for data communications and the display of information. Device 104 is coupled to network 102 via data links. Alternatively, device 104 communicates with network 102 via an over-the-air interface. Device 104 is preferably a computer or a personal digital assistant.

System 100 preferably comprises emergency call site 108. Site 108 is coupled to operator station 112 via data links. Site 108 is preferably a processor with interfaces to network 102, telephone network 114, operator station 112 and databases. Operator station 112, which is preferably a processor-based apparatus with a display device, is coupled to site 108 for voice and data communications and the display of information. An operator interacts with operator station 112.

A user database 110 is associated with site 108 for storing data that is provided when the user registers a communications device 104. Alternatively, device 104 stores the necessary user data in a memory of the device and transmits the necessary data to site 108 during an emergency call. In any event, the identity of the user is preferably automatically displayed at operator station 112 when an emergency call is initiated from the device.

Emergency service numbers database 116 is also associated with site 108 to provide the operator with a telephone number of a local authority needed to assist the user with the emergency. Database 116 consists of emergency service numbers for the police, firefighters and paramedics. Also, database 116 consists of emergency numbers for operators at public safety answering points who, alternatively, connect the emergency call to an emergency authority. Preferably, emergency service numbers database 116 is coupled to the telephone network for access by traditional voice emergency telephone calls. Most preferably, emergency service numbers database 116 is a 911 database found in the telephone network. The 911 database is modified to permit access from site 108 and to permit queries for emergency numbers based on geographic location, including address, landmarks, and xyz coordinates, in addition to traditional queries based on the calling telephone number. The 911 database includes a Master Street Address Guide ("MSAG") database; a Selective Routing Database ("SRDB"), which is the routing table containing the telephone number to emergency service numbers relationship; and an Automatic Location Identification ("ALI") database.

Network 114 is the public telephone network. Network 114 receives and switches emergency calls received from operator station 112 to emergency authority 116 or to public safety answering point (PSAP) 118. Network 114 is coupled to operator station 112 through site 108 for voice communications. PSAP 118 is a switching system with operator stations for handling emergency calls. Operator station 112, emergency authority 116, and PSAP 118 are coupled to telephone network 114 via trunks. A wide variety of trunks are employed for this function including SS7 (signaling system 7) trunks.

Figure 2:
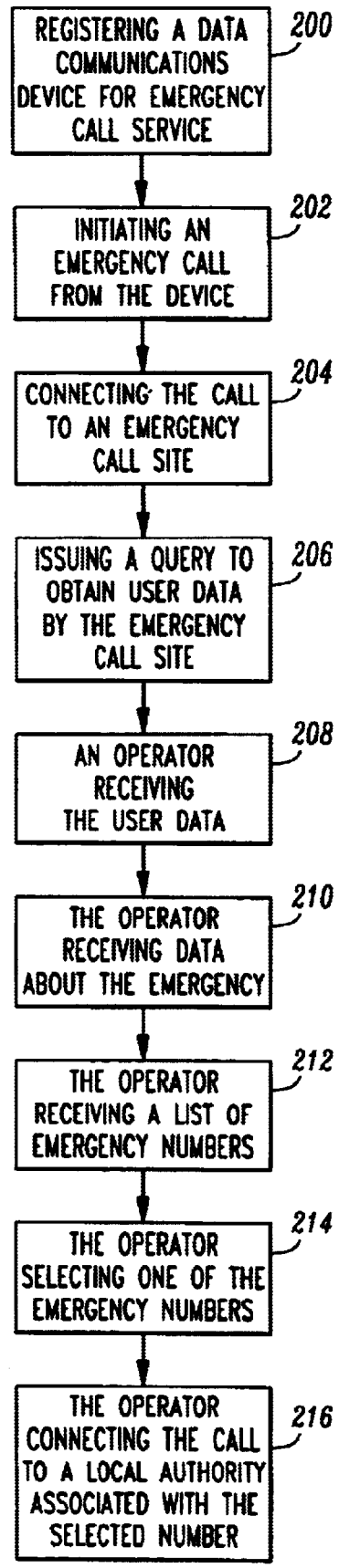
FIG. 2 is a flow chart illustrating a method to initiate an emergency call from a data communications device that is coupled to a wide area data network in accordance with the present invention.

FIG. 2 illustrates a method to initiate emergency calls from a data communications device coupled to a wide area data network in accordance with the present invention. First, a user registers the device for emergency call service (200). This is accomplished in the preferred embodiment by entering data in a user database that is associated with an emergency call site. The data entered preferably includes the user's name, address, telephone number, medical information and communications device capabilities, such as, Internet chat support, voice support, and text messaging. Registration with the emergency call site (200), although preferred, is not necessarily required.

Upon occurrence of an emergency, the user initiates an emergency "call" from the device (202). This is accomplished in the preferred embodiment by pressing a designated emergency button or by dialing a predetermined sequence of keys on a keypad of the communications device. In response, the communications device connects to the emergency call site over the wide area data network (204). Communication with the emergency call site is over the wide area data network and occurs in a data transfer protocol, including, for example, an Internet packet protocol. Preferably, site 108 issues a query to user database 110 to obtain user data entered by the user during the registration process (206). If no user data is available in the user database 110, then user data is obtained directly from the communications device, to the extent available. Data regarding the user and the communications device capabilities are displayed to the operator to facilitate the emergency call (208).

Preferably, based on the communications device capabilities, site 108 initiates a real-time online chat with the user placing the emergency call. The chat is alternatively an exchange of text messages, the encoding and decoding of voice, or a combination of these based on the communications device capabilities. As an alternative to the online chat, other communications are established with the user, such as a voice call over the telephone network.

The operator who handles the emergency call then receives data about the emergency from the user (210). The data preferably includes information such as the nature and the location of the emergency. Where the communications device supports a location determining device, such as the global positioning system, location data may be automatically provided. Similarly, the time of day may be automatically provided by the communications device.

Next, the operator obtains a list of emergency numbers based on the data received from the user (212), including the location data and time of day. This is accomplished by using an existing emergency service numbers database that consists of emergency numbers to local authorities, including, emergency authorities and public safety answering points. The emergency service numbers database correlates an emergency location, as identified by a telephone number, location data, or other data obtained from the user, with appropriate emergency authorities who are able to respond at the time of the emergency. The operator selects one number from the list of emergency numbers (214). Finally, the operator connects the user to a local authority associated with the selected emergency number and relays the pertinent information regarding the emergency to the local authority (216).

Although interaction with an operator for handling emergencies is preferred, the operations performed by the operator are alternatively handled by operator station 112 under control of a stored program that emulates the operator functions.

The present invention allows a user to initiate an emergency call from a data communications device coupled to a wide area data network. The emergency call is connected to an emergency call site that is associated with the wide area data network. An operator who is associated with the emergency call site connects to a local authority in the telephone network based on information obtained from the user. Advantageously, this invention provides a method and apparatus that allows a user of a data communications device to make an emergency call over the wide area data network when a telephone is unavailable or is not within close proximity to the user.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A method for servicing emergency calls from a data communications device coupled to a data network, the method comprising the steps of:

A) receiving over the data network an emergency call initiated by a user from the data communications device;

B) an operator associated with the emergency call site obtaining data from a user database that is coupled to the emergency call site;

C) the operator receiving data regarding the emergency from the user;

D) the operator selecting one of a predetermined set of emergency numbers based on the data received from the user or the user database; and E) the operator connecting the emergency call to a local authority associated with the one of the predetermined set of emergency numbers selected by the operator.

2. The method of claim 1 wherein prior to step A the method further comprises the step of:

receiving user data for registering for service on an emergency call site that is associated with the data network.

3. The method of claim 2 wherein the step of receiving user data further comprises:

the user providing personal data; and the user providing data about the data communications device, wherein the data is stored in the user database.

4. The method of claim 3 wherein the personal data includes at least one of name, address, telephone number, and medical data.

5. The method of claim 1 wherein the data communications device is one of a personal digital assistant or computer.

6. The method of claim 1 wherein the user initiates the emergency call by dialing a predetermined sequence of keys on the data communications device.

7. The method of claim 1 wherein the user initiates the emergency call by pressing a button on the data communications device.

8. The method of claim 1 wherein the local authority is an emergency authority.

9. The method of claim 1 wherein the local authority is another operator at an operator station coupled to a telephone network.

10. The method of claim 1 wherein the operator receives data regarding the emergency via an online chat.

11. The method of claim 10 wherein the operator receives data regarding the emergency via an online chat that exchanges at least one of text messages and encoded voice.

12. An emergency call station that comprises:
    a processor coupled to a data network;
    wherein the processor:
        receives a request for emergency call service from a data communications device coupled to the data network; and
        receives emergency data from a user of the data communications device;
        wherein user data is obtained from one of a user database that is coupled to the emergency call station or the data communications device; and
        wherein the emergency data is received by the processor via the data network.

13. The emergency call station of claim 12 wherein the data communications device is one of a personal digital assistant or computer.

14. The emergency call station of claim 12 wherein the emergency data is received by the processor via an online chat that exchanges at least one of text messages or encoded voice.

15. The emergency call station of claim 12 wherein the emergency data includes a location of an emergency situation and a time of day.

16. The emergency call station of claim 12 wherein the user data is previously registered by the user and stored in the user database.

* * * * *